(12) United States Patent
Verboekend et al.

(10) Patent No.: US 12,358,801 B2
(45) Date of Patent: Jul. 15, 2025

(54) METHOD FOR GENERATING NEW FAUJASITE ZEOLITES

(71) Applicant: Zeopore Technologies NV, Bertem (BE)

(72) Inventors: Danny Verboekend, Bertem (BE); Martin D'Halluin, Bertem (BE)

(73) Assignee: ZEOPORE TECHNOLOGIES NV (BE)

( * ) Notice: Subject to any disclaimer, the term of this patent is extended or adjusted under 35 U.S.C. 154(b) by 783 days.

(21) Appl. No.: 17/416,052

(22) PCT Filed: Dec. 19, 2019

(86) PCT No.: PCT/EP2019/086210
§ 371 (c)(1),
(2) Date: Jun. 18, 2021

(87) PCT Pub. No.: WO2020/127664
PCT Pub. Date: Jun. 25, 2020

(65) Prior Publication Data
US 2022/0073359 A1    Mar. 10, 2022

(30) Foreign Application Priority Data

Dec. 20, 2018   (EP) ..................................... 18214940

(51) Int. Cl.
*C01B 39/02*       (2006.01)
*B01J 29/08*       (2006.01)
(Continued)

(52) U.S. Cl.
CPC ........... *C01B 39/026* (2013.01); *B01J 29/084* (2013.01); *B01J 35/617* (2024.01); *B01J 35/633* (2024.01);
(Continued)

(58) Field of Classification Search
None
See application file for complete search history.

(56) References Cited

U.S. PATENT DOCUMENTS

| 2011/0108460 A1 | 5/2011 | Simon et al. |
| 2013/0183231 A1 | 7/2013 | Senderov et al. |

FOREIGN PATENT DOCUMENTS

| WO | 2015100171 A1 | 7/2015 |
| WO | 2017148852 A1 | 9/2017 |

OTHER PUBLICATIONS

Gervais et al., Cleaning marble with ammonium citrate, Studies in Conservation, 2010 (Year: 2010).*

(Continued)

*Primary Examiner* — Coris Fung
*Assistant Examiner* — Keling Zhang
(74) *Attorney, Agent, or Firm* — DINSMORE & SHOHL LLP

(57) ABSTRACT

The invention is broadly drawn to a process to introduce mesoporosity in faujasite zeolites with Si/Al<5 and unit cell sizes below 24.58 Angstrom by an inventive sequence of acid and base treatments, yielding superior physico-chemical and catalytic properties compared to the materials prepared according to the teachings known in the state of the art. Part of the invention relates to the acid step which is executed in the presence of a salt of which the anion is able to form multi-ligand complexes with aluminum, and of which a specific amount of cations are protonic (ca. 90% to 20% of the total cations with −3<pK<6). The superior properties may be the combination of an enhanced mesoporosity with a higher Brønsted acidity, a higher microporosity, a higher mesoporosity, a higher crystallinity, and/or combinations hereof.

11 Claims, 2 Drawing Sheets

(51) Int. Cl.
*B01J 35/61* (2024.01)
*B01J 35/63* (2024.01)
*C01B 39/24* (2006.01)

(52) U.S. Cl.
CPC .......... *C01B 39/24* (2013.01); *B01J 2229/37* (2013.01); *B01J 2229/38* (2013.01); *C01P 2006/12* (2013.01); *C01P 2006/14* (2013.01)

(56) References Cited

OTHER PUBLICATIONS

Fyfe et al., "Magic-Angle-Spinning NMR (MAS-NMR) Spectroscopy and the Structure of Zeolites", Angewandte Chemie, 1983, 22, 259-336.
Groen et al., "Pore size determination in modified micro- and mesoporous materials. Pitfalls and limitations in gas adsorption data analysis", Microporous Mesoporous Materials, 2003, 60, 117.
Bearlocher et al, "Atlas of Zeolite Framework Types", 2007, 6th edition, pp. 140-141.
Danny Verboekend et al, "Hierarchical Y and USY Zeolites Designed by Post-Synthetic Strategies", Advanced Functional Materials, Vo.. 22, No. 5, Mar. 7, 2012.
Extended European Search Report completed Mar. 29, 2019 in related European Application No. 18214940.1.
International Search Report and Written Opinion mailed Apr. 8, 2019 in related International Application No. PCT/EP2019/086210.

\* cited by examiner

METHOD FOR GENERATING NEW FAUJASITE ZEOLITES

CROSS-REFERENCES TO RELATED APPLICATIONS

This application is a national-stage application under 35 U.S.C. § 371 of International Application No. PCT/EP2019/086210, filed Dec. 19, 2019, which International Application claims benefit of priority to European Application No. 18214940.1, filed Dec. 20, 2018.

TECHNICAL FIELD

This invention generally relates to a process to perform sequences of acid and base treatments on steamed faujasite zeolites with high Al-content, yielding superior physicochemical and catalytic properties.

BACKGROUND

Zeolites are microporous aluminosilicate oxide structures that have well-defined pore structures due to a high degree of crystallinity. Crystalline aluminosilicate zeolites can have a natural and a synthetic origin. In the protonic form, the crystalline aluminosilicate zeolites are generally represented by the formula, $H_xAl_xSi_{1-x}O_2$, where "H" is a (exchangeable) proton that balances the electrovalence of the tetrahedra. The amount of exchangeable protons is referred to as the cation exchange capacity (CEC). The exchangeable protons can easily be replaced other cations such as ammonium, potassium, and sodium cations. The exact structure type of an aluminosilicate zeolite is generally identified by the particular silicon to aluminum molar ratio (Si/Al) and the pore dimensions of the cage structures. The size of the micropores (typically in the range of 0.4-1 nm) can be indicated with the number of T-atoms on the smallest diameter, the so called 'membered rings' (MRs). Using this definition, most common industrial zeolites feature micropores of 8 MRs, 10 MRs, or 12 MRs. The zeolite structure can also be made using, in addition to silica and alumina, phosphates, giving rise to the class of crystalline microporous silicoaluminophosphates (SAPOs). In addition, when silica is no longer present, crystalline microporous aluminophosphates (AlPOs) are formed. SAPOs and AlPOs possess, like zeolites, unique porous and acidic properties enabling them wide scale industrial application in catalysis, adsorption, and ion exchange.

Within the different types of commercial zeolites, Y and derived USY zeolites can be considered the most relevant for catalysis, based on their large scale and wide-spread use in fluid catalytic cracking (FCC) and hydrocracking (HDC). Y and USY zeolites feature the faujasite topology, and combine relatively large micropores in a 3D dimensional pore structure.

USY zeolites are made by steam treatment of Y zeolites. During steam treatment of Y zeolites aluminum from the zeolite framework is expulsed to the bulk of the zeolite, yielding a more silicon rich and stable zeolite framework. Accordingly, steamed Y zeolites are commonly referred to as 'ultra-stable Y' zeolites or 'USY' zeolites. As a result of steaming, the Si/Al ratio of the framework increases, which concomitantly reduces the unit cell size. As the Al removed from the framework remains in the solid as extra-framework aluminum, the Si/Al ratio of the bulk is usually not significantly influenced during steam treatment.

Y and USY zeolites with bulk Si/Al<5 are particularly of interest as they are used on a large scale in FCC. The group of USY and Y zeolites with bulk Si/Al<5 covers a large number of materials as not only the bulk Si/Al ratio can vary (from ca. 2.5 to 5 mol mol$^{-1}$), but also the Si/Al ratio of the framework. Typical unit cell sizes of Y and USY zeolite with Si/Al<5 mol mol$^{-1}$ vary from ca. 24.65 Angstrom (for an unsteamed NaY zeolite) to ca. 24.24 Angstrom (a heavily steamed Y zeolite).

Recently, hierarchical (mesoporous) zeolites, SAPOs, and AlPOs have attracted substantial attention because of their potential advantages in catalysis due to their high external surface area, reduced diffusion path lengths, and exposed active sites. The introduction of a secondary network of mesopores (typically in the range of 2-50 nm) leads to substantial changes in the properties of materials, which have an impact on the performance of zeolites in traditional application areas such as catalysis and separation. The number of accessible active sites increases rapidly with the enhanced porosity of the material. Additionally, the hierarchical zeolite crystals display reduced diffusion path lengths relative to conventional microporous zeolites, AlPOs, or SAPOs. Accordingly, these materials have attained superior performance in many catalytic reactions, such as cracking, alkylations, and isomerisations.

Hierarchical zeolites can be made using a wide variety of bottom-up and top-down procedures. Bottom-up procedures imply a change in the hydrothermal synthesis of the zeolites, for example by using organic templates or by lengthening the crystallization time. However, the most industrially attractive variant may be the (top-down) post-synthetic modification of conventional commercially-available microporous zeolites. Within this category, it is common that elements are removed from the zeolite framework solid to instigate a certain effect.

Methodologies to prepare mesoporous zeolites by post-synthetic modifications can be considered effective when substantial sums of secondary mesopore volume, $V_{meso}$ (often exceeding the micropore volume, $V_{micro}$) are introduced. It is considered important that the zeolite's intrinsic properties (microporosity, acidity, crystallinity) are not lost during or after the modifications, as this can lead to the loss of the catalytic performance.

The methodologies to convert Y and USY zeolites successfully to the hierarchical form, can depend strongly on the composition of the framework and the composition of the bulk of the solid (see for example Adv. Funct. Mater, 2012, 22, 916-928). The main constituents of zeolites are typically silicon and aluminum, and the bulk and framework Si/Al are commonly indicated as a core criteria of influence in post-synthetic modification strategies.

The post-synthetic strategies to prepare mesoporous zeolites from un-steamed NaY zeolites (bulk Si/Al ratio of 2.5-3 mol mol$^{-1}$, unit cell size of ca 24.60-24.70 Angstrom) can be very effective (see for example Adv. Funct. Mater, 2012, 22, 916-928, Table 1). For example, using acid-base treatments, Y zeolites can be converted into materials containing strongly enhanced mesoporosity and largely preserved intrinsic zeolite properties. The method used for Y zeolites typically entails performing an acid treatment using an organic acid able to form a multi-ligand complex with aluminum, such as citric acid or (tetra proton) ethylenediaminetetraacetic acid ($H_4$EDTA), followed by a base treatment with a strong inorganic base, such as NaOH or KOH.

Also steamed and dealuminated USY zeolites, with bulk Si/Al>5 mol mol$^{-1}$ and unit cell sizes of <24.58 Angstrom, are routinely prepared effectively in hierarchical form by direct base treatment alone (see for example WO2017148852, Table 1).

For steamed USY zeolites with unit cell size <24.58 Angstrom but relatively low Si/Al ratio in the bulk (Si/Al<5 mol mol$^{-1}$), however, the existing post-synthetic strategies do not suffice in preparing attractive mesoporous faujasites (see for example Adv. Funct. Mater, 2012, 22, 916-928, Table 1). Both direct base treatment or the application of the acid-base treatment strategy do not lead to the desired mesopore formation, and/or induce a severe and undesired reduction of the intrinsic zeolitic properties. Hence, there is a clear commercial need for effective methods to generate mesoporous USY zeolites with bulk Si/Al<5 and unit cell sizes <24.58 Angstrom.

The invention disclosed herein relates to the transformation of faujasite zeolites with Si/Al<5 and unit cell size <24.58 Angstrom into high-quality mesoporous zeolites using an inventive sequence of acid-base treatments. The materials obtained using the invention have significantly higher mesoporosity and higher intrinsic properties compared to those obtained using the state of the art techniques.

SUMMARY

The invention is broadly drawn to a process to introduce mesoporosity in faujasite zeolites with Si/Al<5 and unit cell sizes below 24.58 Angstrom by an inventive sequence of acid and base treatments, yielding superior physico-chemical and catalytic properties compared to the materials prepared according to the teachings known in the state of the art. Part of the invention relates to the acid step which is executed in the presence of a salt of which the anion is able to form multi-ligand complexes with aluminum, and of which a specific amount of cations are protonic (ca. 90% to 20% of the total cations with −3<pK<6). The superior properties may be the combination of an enhanced mesoporosity with a higher Brønsted acidity, a higher microporosity, a higher mesoporosity, a higher crystallinity, and/or combinations hereof.

DETAILED DESCRIPTION

Figure 1:
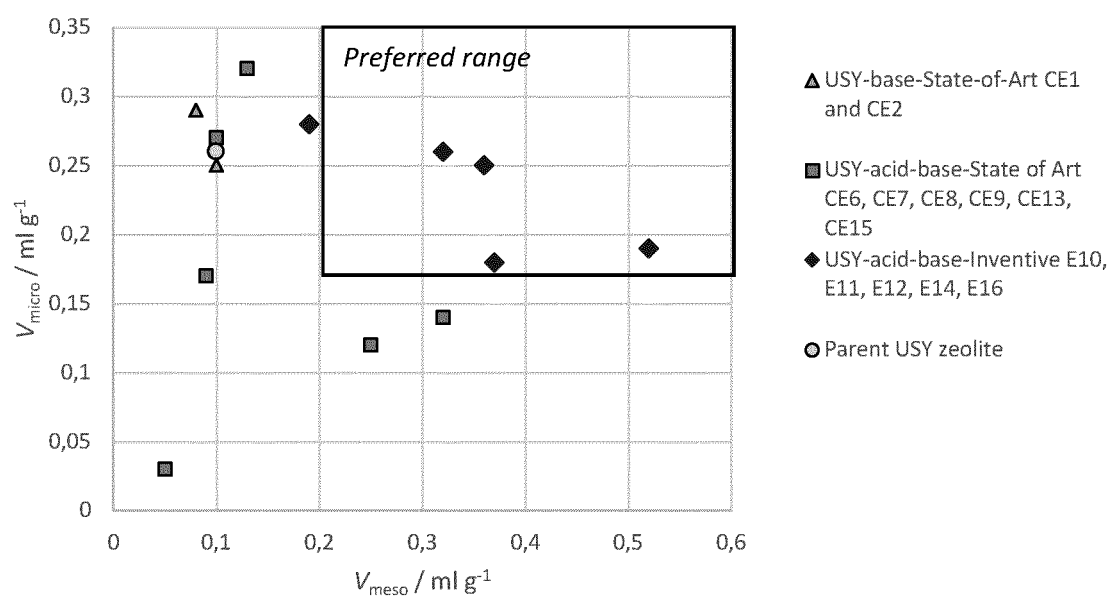
FIG. 1: Microporosity ($V_{micro}$) versus mesoporosity ($V_{meso}$) for the solids derived from the various examples. The box highlights that the samples according to the invention display the preferred porous properties.

Various embodiments of the invention relate to the preparation a mesoporous faujasite zeolite. In several embodiments the mesoporous material may be prepared by contacting an untreated parent faujasite material in an acidic aqueous solution. As used herein, an acid treatment refers to the contacting of a solid with an aqueous solution of pH smaller than 7. The acidic solution may contain at least one salt of which the anion is able to form multi-ligand complexes with aluminum in aqueous solutions. The cations of the salt may be largely acidic but not fully acidic. Similarly, the cations of the salt may be largely non-acidic but not fully non-acidic. The acid-treated treated may be subsequently subjected to a base treatment. As used herein, a base treatment refers to the contacting of a solid with an aqueous solution of pH larger than 7. The resulting mesoporous faujasite may be exposed to further post-synthetic steps and may be finally used in a number of commercially-relevant catalytic and non-catalytic applications.

Relevant zeolites are those with the faujasite topology, such as 'Y' and 'USY' zeolites. In this sense, reference to a 'faujasite' can mean both zeolites. Conversely, the mentioning of a material with the faujasite framework and a specific unit cell size enables to discern between Y and USY zeolite. Herein, a 'Y' zeolite refers to a material with the faujasite topology and a unit cell size of 24.70 to 24.60 Angstrom. The term 'to be treated zeolite' refers to the solid (often not very mesoporous) to which the acid and base treatments are applied and can also be referred to as the 'parent zeolite'. Herein, a 'USY' zeolite refers to a material with the faujasite topology and a unit cell size of 24.59 Angstrom and smaller. The faujasite framework is defined as in 'Atlas of Zeolite Framework Types' by Bearlocher, McCusker, and Olsen, 2007, 6$^{th}$ edition, pages 140-141. When a zeolite is referred to as being in the 'proton form' or the 'ammonium form' it is meant that the exchangable cation within the zeolite framework is a proton or ammonium, respectively. The bulk Si/Al ratio as used herein is defined as the atomic ratio of silicon atoms versus aluminum atoms in the entirety of the solid (in the unit mol Si per mol Al, also used as 'mol mol$^{-1}$'), and can be obtained by spectroscopic techniques such as inductively-coupled plasma atomic emission spectroscopy or atomic absorption spectroscopy. In the case the zeolite contains extra-framework (non-zeolitic) species, these are included. As steamed Al-rich faujasites typically contain a lot of extra-framework aluminum, the Si/Al ratio of the bulk is usually substantially lower than the Si/Al ratio of the framework.

The properties of the to be treated and resulting solids may be assessed using nitrogen adsorption at 77 K as it is a well-established technique to quantify the intrinsic zeotypical properties (relevant for crystalline microporous solids), as well as the secondary (meso)porosity in the solid. A descriptor that is derived from the nitrogen isotherm is the total surface area ($S_{BET}$), as it gives an indication of the overall porosity (micropores and mesopores) of the solids. The intrinsic zeotypical properties can be examined using the micropore volume ($V_{micro}$), which is derived from application of the t-plot to the adsorption branch of the isotherm. Since the zeolite's active sites are largely located in the micropores, it is preferred that upon post-synthetic modification using acid and base treatments the micropore volume remains as high as possible. The t-plot method simultaneously yields an external surface (referred to '$S_{meso}$') which is used as an indication for the degree of secondary porosity. The total pore volume ($V_{pore}$) is used as an indicator for the overall porosity. The mesopore volume is also an indicator of the amount of generated secondary porosity, and ($V_{meso}$) is defined as $V_{meso}=V_{pore}-V_{micro}$. It is generally thought most desirable to attain solids with the highest microporosity ($V_{micro}$) and mesoporosity ($S_{meso}$, $V_{meso}$), yielding in turn the high overall porosity ($S_{BET}$, $V_{pore}$).

Non-zeolitic mesoporous aluminosilicates, such as MCM-41 and SBA-15 and aluminosilicates contacted with micelle-forming tetraalkylammonium cations (such as cetyltrimethylammonium cations) under alkaline conditions, can display substantial microporosity. This type of microporosity is often 'non-ordered' instead of well-defined, and therefore should not be considered zeolitic. The microporosity as defined within the embodiments of this contribution is derived primarily from the well-defined zeolitic micropores related to the framework topologies, which are well described within the state of the art.

As used herein, the micropore volume ($V_{micro}$), mesopore volume ($V_{meso}$), mesopore surface area ($S_{meso}$), total pore volume ($V_{pore}$), and total surface area ($S_{BET}$) were obtained using nitrogen sorption analysis at 77 K. Nitrogen-sorption measurements were executed using a Micromeritics TriStar II instrument, controlled by TriStar 3020 software (Micromeritics) version 3.02. Prior to the sorption experiment, the samples were degassed overnight under a flow of $N_2$ with heating to 300° C. The $S_{BET}$ was attained by application of the BET model to the adsorption branch of the isotherm in the range of $p/p_0$=0.05-0.35. The $V_{micro}$ and $S_{meso}$ were obtained by using the t-plot. The t-plot method, as described in Microporous Mesoporous Mater. 2003, 60, 1-17, was used to distinguish between micro- and mesopores (thickness range=0.35-0.50 nm, using thickness equation from Harkins and Jura, and density conversion factor=0.0015468). To accurately compare the microporosity derived from the t-plot among solids, it is preferred that the same t-plot method and thickness range and thickness equation are used. For example, if the t-plot is applied in a narrow range at high relative pressures (for example at $p/p_0$=0.30-0.35) the resulting microporosity can be an overestimation. The $V_{pore}$ was obtained at $p/p_0$=0.99.

The preservation of the intrinsic properties and the unit cell size can be examined using X-ray diffraction (XRD). This technique results in a topology-specific reflection pattern. The relative crystallinity, indicative for the overall intrinsic zeotypical properties, can be assessed by integration of several characteristic peaks using methods such as described in ASTM D3906. It is preferred that the acid- and alkaline-treated sample displays a crystallinity as high as possible relative to the starting crystalline inorganic solid. X-ray diffraction is also a useful characterization technique as it enables to determine the unit cell size, expressed in Angstrom. Particularly in the case of faujasites, the unit cell size is relevant as it gives an indication of the composition (atomic Si/Al ratio) of the framework. The unit cell size as used herein derived using established methods as specified in ASTM 3942.

Another method to monitor the influence of a post-synthetic treatment is by means of magic angle scanning nuclear magnetic resonance (MAS NMR) spectroscopy. This technique probes the coordination of the T-atoms (Al and Si). In the case of aluminum ($^{27}$Al MAS NMR), it is generally assumed that zeolitic framework tetrahedrally-coordinated species occur in the range of 40 ppm to 80 ppm, whereas partly-framework pentahedrally-coordinated species occur in the 10 ppm to 40 ppm range, and extra-framework octahedrally-coordinated species occur in the range 10 ppm to −40 ppm (Angewandte Chemie, 1983, 22, 259-336). The amount of extra-framework aluminum is defined herein is measured using $^{27}$Al MAS NMR and expressed as the percentage of aluminum in the range −40 ppm to 40 ppm over the aluminum in the range −40 ppm to 80 ppm.

The to be treated zeolite relevant for the invention can have a variety of properties. The zeolite preferably has the faujasite topology. The bulk Si/Al ratio is preferably at most 10, more preferably at most 6, and most preferably at most 4. The preferred unit cell size ranges 24.60-24.20 Angstrom, more preferably from 24.55-24.35 Angstrom, and most preferably from 24.55-24.45 Angstrom. The samples preferably possess significant amounts of extra-framework aluminum, where preferably at least 10% of the Al is extra-framework aluminum, more preferably at least 20%, and most preferably at least 30%. The preferred to be treated zeolite possesses a micropore volume in the range of 0.10-0.40 ml/g, preferably 0.15-0.35 ml/g, and most preferably 0.20-0.33 ml/g. The preferred to be treated zeolite possesses a mesopore volume in the range of 0.01-0.30 ml/g, preferably 0.03-0.20 ml/g, and most preferably 0.05-0.15 ml/g. The preferred to be treated zeolite possesses a mesopore surface in the range of 20-200 m$^2$/g, preferably 40-150 m$^2$/g, and most preferably 60-100 m$^2$/g. The preferred to be treated zeolite possesses a total pore volume in the range of 0.20-0.50 ml/g, preferably 0.25-0.45 ml/g, and most preferably 0.30-0.40 ml/g. To be treated solids preferably display an overall BET surface in the range of 300-900 m$^2$/g, and more preferably in the range of 400-750 m$^2$/g, and most preferably in the range of 500-650 m$^2$/g. The parental to be treated zeolite can resemble a mildly steamed but not dealuminated faujasite, such as a CBV 500 zeolite supplied by Zeolyst. The parental to be treated zeolite can resemble a severely steamed faujasite but not dealuminated, such as a CBV 600 zeolite supplied by Zeolyst. The zeolite can have any exchangeable cation located in its micropores, such as a proton, sodium, potassium, and calcium. In some embodiments, the ammonium or proton are preferred as exchange cation located in the micropores of the zeolite.

Part of the invention relates to the dissociation of salts during the acid step. It is preferred that, of the dissociated salt, the anion is able to from multi-ligand complexes with one or more aluminum atoms. Herein, the term 'multi-ligand complexes' refers to the ability of an anion to coordinate multiple bonds with a single aluminum cation, such as a single EDTA anion, or to the ability of an anion to coordinate with several aluminum cations, such as $PO_4^{3-}$. Herein the term 'salt' refers to a combination of cation and anion, and does not imply anything else, such as whether it is dissolved, a solid or a liquid. For example, herein HCl, NaCl, citric acid, and tri-sodium citrate are all referred to as a salts. Importantly, water is not included as a salt herein as water molecules hardly dissociate into cations (H$^+$) and anions ($^-$OH). As used herein the definition of 'dissociation' refers to the propensity of a larger object to separate reversibly into smaller components, such as when a complex falls apart into its component molecules, or when a salt splits up into its component ions. Herein, 'cations' are defined as positively charged components ions, such as Na$^+$, K$^+$, Mg$^{2+}$, protons (H$^+$), or tetra-alkylammonium cations. Herein, cations are defined as 'acidic', 'protic', or 'protonic' when the cation is a proton. Herein, 'anions' are defined as negatively charged components ions, such as citrate$^{3-}$, NO$_3^-$, PO$_4^{3-}$, SO$_4^{2-}$, Cl$^-$, and Br$^-$. The derived dissociation constant (pK) quantifies the propensity to dissociate. Herein the 'pK' is used in the same fashion as the 'pKa', which is generally used for salts that are able to release a proton, and is used as defined in well-known textbooks such as K. W. Whitten et al. in 'General Chemistry', ISBN-13: 978-0534408602. Herein, pK values formulated for salts in aqueous solutions are used. In general, the pK is smaller for complexes that easily dissociate and larger for those that do not easily dissociate. Herein, the definition 'pK' is used for both acidic and non-acidic salts or complexes. As used herein, the pKa (hence pK) values of common acids are listed in Table 2. For example, the pKa value of HCl (−6) is assumed to be equal to the pK of NaCl. Similarly, the pKa values of citric acid (3.1, 4.8, and 6.4) are assumed to be equal to the pK values related to the dissociation of the three sodium cations of Na$_3$citrate.

Examples of relevant salts for the invention are those based on organic molecules with carboxylic groups. Preferred anions of the invention are those derived from citric acid, tartaric acid, EDTA, malic acid, etc., that are able to form multi-ligand complexes with aluminum. However, also inorganic anions may be used, such as those based on salts containing sulphates and phosphates. The dissociation of these salts in the solvent is important, and suitable dissociation constants range from low (pK=−3) to high (pK=6.0). This range applies to the 'acidic' variants of the salt, featuring one or more protons as cations, such as citric acid, $H_4$EDTA, tartaric acid, and also to 'non-acidic' variants of the salt featuring salts that do not involve a proton but any other cation (such as tetra sodium EDTA or tri sodium citrate).

For the acidic cationic part of the salt, the cation is a proton ($H^+$). For the non-acidic cationic parts of the salt, there is no preferred cation, but may be chosen as to not result into secondary inhibitive effects, such as a severely limited dissolution. Examples of suitable cations are alkali metals, water-soluble alkaline earth metals, ammonium, and combinations thereof.

Within the invention, the ratio between acidic and non-acidic cations in the salt is important. To induce the inventive effect cations are preferably derived from salts with dissociation constants (pK values) ranging from −6 to 10, more preferably ranging from −4 to 8, and most preferably from −3 to 6. The non-acidic part of the cation of the salt can be ca. 10% to 80%, preferably ca. 20% to 65%, and most preferably, 30% to 55% of the total amount of cations in the salt. As used herein, the percentage of acidic versus non-acidic cations is determined counting only the cations with pK values in between −3.0 and 6.0. Within the calculation of this percentage bivalent cations are counted two-fold, trivalent cations count three-fold, and tetravalent cations count fourfold. For example, the cations of the salt $Ca_{0.25}H_{1.5}$malate are counted as 75% acidic and 25% non-acidic, and are therefore within the scope of the invention.

Within the mixtures of acidic (protons) and non-acidic cations (not protons) the determination of the overall acidity is determined by assuming that the groups with the smallest pK are taken up by the non-acidic cations. For example, in the case 2 equivalents of NaOH are mixed with one equivalent of $H_4$EDTA (with pK of 2.0, 2.7, 6.2, 10.3), it is assumed that the sodium ions take position of the most acidic protons (pK of 2.0 and 2.7), yielding $Na_2H_2$EDTA with protons having pK values of 6.2 and 10.3.

When an acid is mixed with a hydroxide, it is assumed that the hydroxyl ion [$^-$OH] combines with the proton [$H^+$], is neutralized into water, and no longer relevant for the invention. For example, if 2 equivalents of NaOH are mixed with 1 equivalent of citric acid (pK of 3.1, 4.8, and 6.4), a $Na_2$Hcitrate salt follows of which the acidic cation has a pK of 6.4.

Both for $Na_2H_2$EDTA and for $Na_2$Hcitrate the percentage of non-acidic cations derived from complexes with dissociation constants ranging from −3 to 6.0 is 100%, as the remaining acidic protons feature pK's exceeding 6.0 and are not counted in the ratio. $Na_2H_2$EDTA and $Na_2$Hcitrate also do not induce the inventive effect (see comparative examples 13 and 15). In other words, $Na_2H_2$EDTA and $Na_2$Hcitrate are not within the invention as the acidic groups featuring protons are cations which dissociate poorly (pK>6.0) and are not acidic enough to instigate the desired removal of aluminum from the USY zeolite.

In some embodiments, it is possible that during the acid treatment additional salts are present that yield anions unable to form multi-ligand complexes with aluminum but do provide cations (such as a HCl or NaCl). In this case, all cations are taken into account using the same allocation principle as mentioned above: non-acidic cations are allocated to the smallest pKa values. For example, a solution can be made from 1 mole of $Na_3$citrate, which may be mixed with 3 moles of HCl. In this case, the ratio of sodium cations versus protons is 3:3, yielding as a salt $Na_{1.5}H_{1.5}$citrate. As the largest pK of citrate (6.4) is not counted, the ratio of relevant non-acidic versus relevant acidic cations is 1.5 to 0.5, hence 25% of the cations are acidic rendering it within the scope of the invention. The exact same result is obtained if 1 equivalent of citric acid is mixed with 3 equivalents of NaCl. Suitable cation donors can be simple salts such as NaCl, KBr, and $NH_4NO_3$, and mineral acids such as HCl, HBr, and HF. $HNO_3$, $H_3PO_4$, and $H_2SO_4$ may be also cation donors in the case conditions are applied in which the anions are not able to form multi-ligand complexes with aluminum.

In some of the embodiments different types of anions within the scope of the invention can be mixed in the acid treatment step. For example, 1 mole of $Na_4$EDTA can be mixed with 1 mole of citric acid. Here the same allocation of cations applies, and of the 4 types of relevant dissociative groups within the relevant pK range (2.0 and 2.7 from EDTA and 3.1 and 4.8 from citric acid) 100% will be non-acidic, rendering it outside the scope of the invention. However, if 1 mole of $Na_4$EDTA is mixed with 1 mole of $Na_3$citrate and 14 moles of HCl, the averaged salt $Na_{2.3}H_{4.7}$EDTA-Citrate is obtained. Of this salt, the cations within the relevant pK range are distributed at a ratio of 2.3 (non-acidic) versus 1.7 (acidic), hence 43% acidic and therefore within the scope of the invention.

The contacting of the faujasite zeolite with the aqueous solution is defined as any method that enables the chemical agents in the aqueous solution (such as salts, acid, and/or bases) to interact with the to be treated solid to instigate the desired effect (such as a partial dissolution of framework or non-framework species). Herein the term 'aqueous solution' is referred to as water in which the salt, acid, or base is added. Importantly, the term 'aqueous solution' does not imply that the salt, acid, or base is completely dissolved. Although a complete dissolution may often be achieved, it is not a criterion to be met for the invention. For example, although $H_4$EDTA does not easily dissolve in water, it can suitably be used in some embodiments of the invention (See Examples 11, 14, and 16).

In some embodiments, the method comprises contacting the to be treated zeolite with the acid and base in an stirred batch reactor. This can be achieved by adding the acidic or basic solution (or suspension) to the reactor, followed by adding the zeolite powder or zeolite suspension to the reactor. In some embodiments, the zeolite is not in the powder form but in a macroscopic shape such as extrudate, bead, or microsphere. In between the acid and base treatment, the solid may be filtered off and washed using established filtration methods. Residual acid or salt remaining on the solid after filtration is believed not to have a detrimental effect on the subsequent base treatment. In some embodiments, the base treatment may be performed without filtration in between the acid and base treatments. This can be achieved by directly adding enough base to the reacted acid suspension (directly after acid treatment), to increase the pH to the appropriate levels described below.

In some embodiments of the invention, the efficiency of the base and acid treatment process can be further enhanced (in term of generated mesoporosity and preserved crystallinity, microporosity, and acidity, in the resulting zeolites) by addition of additional salts to the acid or basic solution. These salts can have cations selected from the group of ammonium, primary, secondary, and tertiary amines, and quaternary alkyl ammonium ions, and the metal cations from the periodic Groups I, II, and III. The salts comprise anions selected from the group of chloride, bromide, nitrate, phosphate, sulfate, acetate, citrate, oxalate, tartrate, formate, malonate and succinate anions.

In some embodiments, the contacting of the solid to the acid or base is executed in a 'stepwise' or 'gradual' fashion. Here methods established in the state of the art (WO2017148852, for example) may be used. When such methods are applied to a batch reactor, it is preferred that the zeolite is initially brought into a suspension in water, followed by the gradual acid or the gradual base addition. It is preferred that the maximum amount of acid or base brought into contact with the zeolite during the period of less than 5 min, preferably less than 4 min and most preferably less than 3 min, is not more than 75%, preferably not more than 50%, and most preferably not more than 25%, of the overall amount of acid or base to be contacted with the solid over the course of the treatment. The acid or base may be dosed stepwise during an acid or batch treatment by using a pump (for liquids) or powder doser (for solids). Alternatively, the porous solid can be located on a membrane and a (dilute) acidic or basic solution is contacted to it by flowing the said solution through the solid-covered membrane. In addition, the acid or base can be contacted with the zeolite in a continuous stirred-tank reactor, or any other configuration that enables a gradual or stepwise contacting of the solid with the acid or base.

The preferred solvent for the acid treatment is water. Typical solutions to execute the acid treatment feature an overall pH varying from 0-7, preferably 1-5, and most preferably 2-4. As used herein, the amount of zeolite to be treated in an a reactor (referred to as the solid-to-liquid ratio) is expressed as the mass of zeolite per unit volume of the total amount solvent to be used, and yields a unit of g/L. In the case of gradual treatments, this unit refers to the total amount of liquid brought in contact with the zeolite during the course of a treatment. The solid-to-liquid ratio (inorganic porous solid to liquid of acid) can vary from very low 1 g $L^{-1}$ to very high 300 g $L^{-1}$, but is preferably in the range of 20-150 g/L, and most preferably 50-100 g/L. The temperature may range from at least room temperature to at most 100° C., preferably at least 40° C., and most preferably at least 50° C. The acid treatment time can vary from 0.1-76 h, preferably from 0.5-24 h, and most preferably from 1-6 h. As used herein, the concentration of acid or salt is expressed as the number of mols of acid or salt with respect with the mass of the to be treated (parental) zeolite, which yields a unit in mmol $g_{-1}$. The concentration of salt is typically in the range of 0.25-10 mmol per gram of the to be treated zeolite, preferably 0.50-5 mmol per gram, and most preferably 0.75-3 mmol per gram. In the case a gradual acid treatment is executed, the addition rate of the salt is preferably at most 1.0 mmol per gram to be treated zeolite per hour, more preferably at most 0.5 mmol $g^{-1}$ $h^{-1}$, and most preferably at most 0.25 mmol $g^{-1}$ $h^{-1}$.

The preferred solvent for the base treatment is water. Typical solutions to execute the base treatment feature an overall pH varying from 9-14, preferably 10-13.5, and most preferably 11-13. As used herein, the concentration of base is expressed as the number of mols of base with respect with the mass of the to be treated (parental) zeolite, which yields a unit such as mmol $g^{-1}$. With regards to the below-mentioned weight-based units for the base treatment (that is, the solid-to-liquid ratio, the amount of base used, and the addition rate of the base), the mass of the to be treated zeolite prior to the acid treatment is referred to, and not the mass in between the acid and the base treatment. The solid-to-liquid ratio can vary from very low 1 g $L^{-1}$ to very high 300 g $L^{-1}$, but is preferably in the range of 10-150 g/L, and most preferably 20-75 g/L. The temperature may range from at least room temperature to at most 100° C., preferably at least 40° C., and most preferably at least 50° C. The base treatment time can vary from 0.01-24 h, preferably from 0.05-6 h, and most preferably from 0.1-1.5 h. The concentration of base is typically in the range of 0.25-12 mmol per gram of the to be treated zeolite, preferably 0.50-6 mmol per gram, and most preferably 0.75-3 mmol per gram. In the case a gradual base treatment is used, the addition rate of the base is at most 3 mmol per gram to be treated zeolite per minute, preferably at most 1.5 mmol $g^{-1}$ $min^{-1}$, and preferably at most 0.5 mmol $g^{-1}$ $min^{-1}$. Suitable bases can be any that yield a sufficiently high pH, such as NaOH, KOH, CsOH, NH$_4$OH, tetraalkylammonium hydroxides, amines, sodium carbonate, potassium carbonate, sodium aluminate, and mixtures thereof.

The resulting materials preferably combine the preservation of the intrinsic properties (such as microporosity, crystallinity, and acidity) with the introduction of substantial amounts of mesopore surface and mesopore volume. Resulting solids therefore preferably display a micropore volume exceeding 0.15 ml $g^{-1}$, and more preferably exceeding 0.20 ml $g^{-1}$, and most preferably exceeding 0.25 ml $g^{-1}$. Resulting solids preferably display a mesopore volume exceeding 0.20 ml $g^{-1}$, and more preferably exceeding 0.25 ml $g^{-1}$, and most preferably exceeding 0.30 ml $g^{-1}$. Resulting solids preferably display a mesopore surface exceeding 100 m$^2$ $g^{-1}$, and more preferably exceeding 200 m$^2$ $g^{-1}$, and most preferably exceeding 300 m$^2$ $g^{-1}$. Resulting solids preferably display an overall BET surface exceeding 600 m$^2$ $g^{-1}$, and more preferably exceeding 650 m$^2$ $g^{-1}$, and most preferably exceeding 700 m$^2$ $g^{-1}$. The unit cell size of the resulting materials is typically smaller than 24.55 Angstrom, preferably smaller than 24.50 Angstrom, and most preferably smaller than 24.45 Angstrom. The bulk Si/Al ratio is typically below 10 mol mol$^{-1}$, preferably below 6 mol mol$^{-1}$, and most preferably below 4 mol mol$^{-1}$. The crystallinity as quantified using XRD of the resulting solid can be similar compared the starting—to be treated—zeolite, preferably larger than 25% of the parent zeolite, more preferably larger than 50% of the parent zeolite, and most preferably larger than 75% of the parent zeolite.

After the introduction of the mesopores into the solid according to the invention, additional post-synthetic steps may be executed to end up with the final product. For example, ion exchange steps (including rare-earth metals), and subsequent steam treatments may be performed. For industrial large-scale application, zeolite powders (as described in the examples) typically require to be transformed into technical catalysts. Technical catalysts are typically designed to provide the required mechanical strength and chemical stability to withstand demanding industrial catalytic unit operations. The transformation of a zeolite powder into a technical catalyst is preferably performed by mixing the zeolite with several other ingredients (such as fillers, pyrogens, binders, lubricants, etc.) and the subsequent shaping into macroscopic forms. The resulting technical catalysts can be multi-component bodies with sizes from the micrometre to the centimetre range.

The invention relates to a method for preparing a technical catalyst, the method comprising the steps of:

preparing a treated inorganic porous solid according to the first aspect of the invention, and preferred embodiments thereof, adding one or more additional ingredients to form a mixture, preferably wherein the one or more additional ingredients are selected from the group comprising: fillers, pyrogens, binders, lubricants, and combinations thereof, and shaping the mixture into a macroscopic form to obtain a technical catalyst, preferably wherein the macroscopic form has a minimal dimension from at least 1 µm to at most 10 cm.

The inventors have found that the solids obtained by the invention are ideal intermediate compounds for the preparation of a technical catalyst as described above.

The mesoporous zeolite materials resulting from the invention can have, in addition to the preserved intrinisic zeolitic properties, a controlled mesopore volume, mesopore surface, and mesopore size. This advantageously improves the measured catalytic performance in industrial processes, which takes into account mass and energy transfer, reactor conditions, intrinsic catalytic activity and various other parameters. Catalyzed reactions involving hydrocarbons, including petrochemical processing, are mass-transfer limited and significant catalytic benefits can be obtained by using the tailored mesopore architectures obtained by the invention. The mesoporous zeolite materials resulting from the invention can have improved on-line times. A controlled mesopore volume, mesopore surface, and mesopore size can be beneficial to limit catalyst deactivation. For example, catalyst coking leads to catalyst deactivation. The more open, mesoporous structure limits the effects of the clogging of the pores due to carbon deposition and the formation of bulky hydrocarbon molecules. This implies less frequent catalyst regeneration. Catalyst regeneration may also be improved. For example, A controlled mesopore volume, mesopore surface, and mesopore size can allow improved catalyst selectivity. Without being bound by theory, this can be the result of improved mass transfer particularly for bulky reagents, bulky products and bulky intermediates.

The selectivity of small products, that is to say products which are not too bulky for the pores of conventional zeolites, may also be improved at certain reaction conditions. This may be due to the presence of bulky intermediates or transition-states in the reaction path.

The open, mesoporous structure advantageously allows the mesoporous zeolite materials to be used as support for other catalysts, as catalyst or as bifunctional catalyst.

The open, mesoporous structure can advantageously improve reaction conditions. For example, the pressure drop over a catalyst bed comprising mesoporous zeolite materials can be lower. This reduces operating costs.

Hydrocarbon and/or petrochemical feed materials that can be processed with the mesoporous zeolite materials as (part of the) catalyst include, gas oil (e.g. vacuum, light, medium, or heavy gas oil) with or without the addition of resids, thermal oils, residual oils, cycle stocks, whole topped crudes, tar sand oils, shale oils, synthetic fuels (e.g., products of Fischer-Tropsch synthesis), heavy hydrocarbon fractions derived from the destructive hydrogenation of coal, tar, pitches, asphalts, heavy, sour, and/or metal-laden crude oils, and waxy materials, including, but not limited to, waxes produced by Fischer-Tropsch synthesis of hydrocarbons from synthesis gas. Other suitable feedstocks may be (waste) streams of polymers, such as polyethylene, polypropylene, and polystyrene, and hydrotreated feedstocks derived from any of the above described feed materials may also be processed by using the mesoporous zeolite materials described herein.

In various embodiments, the mesoporous zeolite materials as described herein can be employed in chemical processing operations including, for example, catalytic cracking, fluidized catalytic cracking (FCC), hydrogenation, hydrosulfurization (HDS), hydrocracking (HDC), hydroisomerization, oligomerization, alkylation, or any of these in combination. In various embodiments, the mesoporous zeolite can be used as an additive to other catalysts and/or other separation materials including, for example, a membrane, an adsorbent, a filter, an ion exchange column, an ion exchange membrane, or an ion exchange filter.

In various embodiments, mesoporous zeolite materials as described herein can be used as catalyst additives in any other catalytic application. For example, they may be used as additives in processes where bulky molecules must be processed. In various embodiments, a small amount of mesoporous zeolite material may be blended with conventional FCC catalysts to enable pre-cracking of the bulkier molecules in the blend. Conventional FCC catalysts typically have pore sizes that are much too small to accommodate bulkier molecules. After the bulkier molecules have been pre-cracked, the lower-molecular weight hydrocarbons can then be processed more effectively by conventional FCC catalyst. Furthermore, FCC catalysts are quickly deactivated due to coking. This involves carbon deposition in the pores. This deposition is removed in catalyst regeneration processes. Mesoporous zeolite materials as described herein may improve the on-line time of the mesoporous zeolite catalyst or the zeolite catalyst blend.

In other various embodiments, mesoporous zeolite materials as described herein can be used in hydrogenation. Conventional zeolites are good hydrogenation supports because they possess a level of acidity needed both for the hydrogenation of the aromatic compounds and for tolerance to poisons such as, for example, sulfur. However, the small pore size of conventional zeolites limit the size of the molecules that can be hydrogenated. Various metals, such as Pt, Pd, Ni, Co, Mo, or mixtures of such metals, can be supported on mesoporous zeolite materials as described herein using surface modification methods, for example, ion exchange. The hydrogenation catalytic activity of mesoporous zeolite materials as described herein, modified to support various metals (e.g., doped with metals), shows a higher hydrogenation activity for bulky aromatic compounds as compared to other conventional materials, for example, metal supported on alumina, silica, metal oxides, and conventional zeolites. The mesoporous zeolite materials modified to support various metals also show, compared to conventional materials, a higher tolerance to sulfur, for example, sulfur added as thiophene and dibenzothiophene, which are common bulky components of crude oil that often end up in gas oil fractions.

In other various embodiments, mesoporous zeolite materials as described herein can be used in hydrodesulfurization (HDS), including, for example, deep HDS and HDS of 4,6-dialkyldibenzothiophenes. Deep removal of sulfur species from gas oil has two main limitations: the very low reactivity of some sulfur species, for example, dimethyldibenzothiophenes and the presence of inhibitors in the feedstocks such as, for example, $H_2S$. Deep HDS is currently done with active metal sulfides on alumina, silica/alumina, and alumina/zeolite. In HDS, zeolites enhance the hydrogenation of neighboring aromatic rings. Zeolite acidity enhances the liberation of $H_2S$ from the metal sulfide increasing the tolerance of the catalyst to inhibitors. However, bulky methylated polyaromatic sulfur species are not able to access the acidic sites of conventional zeolites. In contrast, the controlled mesoporosity and strong acidity of mesoporous zeolite materials as described herein provide accessibility to the acidic sites and acidity that allows for the deeper levels of desulfurization, which are or will required for meeting current and future environmental restrictions.

In other various embodiments, mesoporous zeolite materials as described herein can be used in hydrocracking (HDC). Metals, including noble metals such as, for example, Ni, Co, W, and Mo, and metal compounds are commercially used in hydrocracking reactions. These metals can be supported on mesoporous zeolite materials as described herein by previously described methods. The mesoporous zeolite materials as described herein including metals can be employed for hydrocracking of various feedstocks such as, for example, petrochemical and hydrocarbon feed materials.

As compared to conventional unmodified catalyst supports such as, for example, alumina, silica, and conventional zeolites, the mesoporous zeolite materials as described herein that have been modified to include one or more catalytic metals may allow for the hydrocracking of higher boiling point feed materials. The mesoporous zeolite materials including metals produce a low concentration of heteroatoms and a low concentration of aromatic compounds. The mesoporous zeolite materials including metals can exhibit bifunctional activity. The metal, for example a noble metal, catalyzes the dissociative adsorption of hydrogen, while the mesoporous zeolite material provides the acidity. Additionally, the controlled mesopore size and controlled mesopore surface in the mesoporous zeolite materials that include metals can make the bifunctional activity more efficiently present in the mesoporous catalysts as compared to a bifunctional conventional catalyst. In addition to the zeolite acidity present in the mesoporous zeolite materials as described herein, the controlled pore size enables larger pores that allow for a high dispersion of the metal phase and further permit processing of larger, longer-chain hydrocarbons.

In other embodiments, mesoporous zeolite materials as described herein can be used in hydroisomerization. Various metals and mixtures of metals, including, for example, noble metals such as nickel or molybdenum and combinations thereof in, for example, their acidic form, can be supported on one or more mesoporous zeolite materials as described herein. Typically, hydroisomerization is used to convert linear paraffins to branched paraffins in the presence of a catalyst and is carried out in a hydrogen-rich atmosphere. Hydroisomerization catalysts useful for isomerization processes are generally bifunctional catalysts that include a dehydrogenation/hydrogenation component and an acidic component. The mesoporous zeolite materials including metals permit hydroisomerization of bulkier molecules than is possible with commercial conventional catalysts due, at least in part, to their controlled pore size and pore volume.

In other embodiments, mesoporous zeolite materials as described herein can be used in the oligomerization of olefins. The controlled pore shape, pore size, and pore volume and preserved microporosity improves the selectivity properties of catalysts formed using mesoporous zeolite materials. The selectivity properties, the increased surface area present in the mesopore surfaces, and the more open structure of the mesoporous zeolite materials can be used to better control the contact time of the reactants, reactions, and products inside the mesoporous zeolite material. During oligomerization, the olefin can be contacted with the mesoporous zeolite materials at relatively low temperatures to produce mainly middle-distillate products. By increasing the reaction temperature, the selectivity can shift and gasoline can be produced as the primary fraction.

When the mesoporous zeolite materials as described herein are used in FCC processes, several beneficial catalytic results may be obtained. First of all, higher degrees of conversion of the feedstock as compared to the conventional zeolite may be obtained at fixed temperatures and at fixed catalyst-to-oil ratios. Next, the conversion of heavy ends or bottoms (boiling points of >375° C.) may be higher, lowering the yield of bottoms. On the other hand, over-cracking may be strongly reduced by the enhanced accessibility, lowering the yield of lights (boiling points<65° C.). The substantially reduced gas formation may in turn enhance the productivity of the FCC cracker. Next, the coke yield may be lower. Finally, based on the increased conversion of bottoms, reduced coking, and reduced gas formation, the yield to light and middle distillates (such as naphtha, gasoline, and diesel, boiling points 65-375° C.) may be significantly increased. A similar shift in yields (more light and middle distillates at the expense of gasses, bottoms, and cokes) may be obtained in other cracking processes (such as HDC) in which the mesoporous zeolites described herein are used.

When the mesoporous zeolite materials as described herein are used in FCC processes, the reduced degree of over-cracking may enlarge the yield of olefins production relative to the paraffins production, as compared to olefins/paraffins ratios obtained using conventional FCC catalysts formed with traditional zeolites. The size of the mesopores of the zeolite materials described herein readily allow the cracked products to exit the pores after reaction. Accordingly, hydrogen transfer reactions are reduced and the undesired transformation of olefins to paraffins in the lights is reduced. In addition, over-cracking and coke formation are limited, which increases the on-line time of the catalyst before regeneration, the average life time of the catalyst and increases the value of the final product.

The acidity and the controlled mesoporosity present in the mesoporous zeolite materials as described herein also make these materials suitable for use in alkylation reactions. Specifically, during alkylation, olefins and paraffins, usually isoparaffins, react in the presence of a catalyst to form highly branched octanes. Because of the mesopore size and volume of the zeolite materials described herein, the highly branched octane products may readily exit the open structure, thereby minimizing unwanted olefin oligomerization and providing a higher volume of desired products.

The higher accessibility combined with the preserved intrinsic properties (acidity and microporosity) make the mesoporous zeolites also very suitable for the conversion of (waste) streams of carbon-based polymers, such as polyethylene, polypropylene, and polystyrene. The streams can be suitably converted by the mesoporous zeolite in cracking or hydrocracking reactions (the latter in the case a metal is deposited on the zeolite and a hydrogen atmosphere is present). In these applications, the plurality of mesoporosity enables to achieve higher conversions degrees of the bulky polymers, a longer catalyst lifetime, a reduced coking of the catalysts, and an easier (more energy efficient) regeneration of deactivated catalysts. Moreover, the reduced over-cracking may yield a larger fraction of light and middle distillates (such as naphtha, gasoline, and diesel, boiling points 65-375° C.) at the expense of lights and gases (boiling points<65° C.).

In other embodiments, a petrochemical feed can be contacted with the mesoporous zeolite materials as described herein under reaction conditions suitable for converting olefins to aromatics. In other embodiments, a petrochemical feed can be contacted with the mesoporous zeolite materials as described herein under reaction conditions suitable for alkylating aromatic hydrocarbons (e.g., benzene and alkylbenzenes) in the presence of an alkylating agent (e.g., olefins, formaldehyde, alkyl halides and alcohols). In other embodiments, a petrochemical feed can be contacted with the mesoporous zeolite materials as described herein under reaction conditions suitable for transalkylating aromatic hydrocarbons in the presence of polyalkylaromatic hydrocarbons.

Generally, suitable conditions for a petrochemical or hydrocarbon feed to contact the mesoporous zeolite materials as described herein include temperatures ranging from about 100 to about 760° C., pressures ranging from above 0 to about 200 atmospheres, a WHSV of from about 0.08 to about 2000 hr$^{-1}$, and a hydrocarbon compound mole ratio of from 0 to about 100.

The mesoporous zeolite material may also have an enabling catalytic performance in reactions involving bulky molecules relevant for the fine chemical and pharmaceutical industry, where conventional zeolites are often not considered. In addition, the mesoporous zeolite material may be employed as an additive to a catalyst typically employed in such fine chemical and pharmaceutical production reactions. Suitable processes include, for example, isomerization of olefins, isomerization of functionalized saturated systems, ring enlargement reactions, Beckman rearrangements, isomerization of arenes, alkylation of aromatic compounds, acylation of arenes, ethers, and aromatics, nitration and halogenation of aromatics, hydroxyalylation of arenes, carbocyclic ring formation (including Diels-Alder cycloadditions), ring closure towards heterocyclic compounds, amination reactions (including amination of alcohols and olefins), nucleophilic addition to epoxides, addition to oxygen-compounds to olefins, esterification, acetalization, addition of heteroatom compounds to olefins, oxidation/reduction reactions such as, but not limited to, Meerwein-Ponndorf-Verley reduction and Oppenauer oxidation, dehydration reactions, condensation reactions, C—C formation reactions, hydroformylation, acetilization, and amidation.

In other embodiments of the invention the mesoporous zeolites are used in non-catalytic reactions. In these cases, the preservation of microporosity is important to achieve the desired effect. For example, the microporosity, mesoporosity, and ion exchange properties present in the mesoporous zeolite materials as described herein can enable removal of inorganic and organic compounds from solutions. Suitable solutions can be aqueous or organic solutions. In addition, the mesoporous zeolite materials as described herein can be used to adsorb gaseous compounds including, for example, volatile organic compounds, which are too bulky to be adsorbed by conventional unmodified zeolites. An example is wastewater treatment, wherein the use of conventional unmodified zeolites requires extensive pre-treatment to prevent rapid catalyst deactivation.

In other embodiments, the mesoporous zeolite materials as described herein can be grown on various supports by employed techniques such as, for example, seeding, hydrothermal treatment, dip coating, and/or use of organic compounds. They can be physically mixed with conventional zeolites or metal oxides. Continuous layers of mesoporous zeolite materials can be used as membranes and/or catalytic membranes on, for example, porous supports. Mesoporous zeolite materials as described herein can be employed in various configurations including, for example, membranes for separation of gases based on physicochemical properties such as, for example, size, shape, chemical affinity, and physical properties.

EXAMPLES

Comparative Example 1: A faujasite with Si/Al 2.6, unit cell size of 24.53 Angstrom, and in the ammonium form (CBV 500 supplied by Zeolyst) was exposed to a single base treatment. To this end, an aqueous solution of 6 mmol g$^{-1}$ of NaOH was made, which was contacted with 33 g L$^{-1}$ of zeolite. The base treatment was performed at 65° C. for 30 min in a stirred round-bottomed flask on a 100 ml scale. After the reaction, the solid was isolated from the suspension using Buchner filtration and dried. The resulting solid showed that neither mesopore surface or mesopore volume increased (Table 3). Hence, the standard state-of-the-art base treatment does not enable to convert a faujasite with Si/Al<5 and unit cell size of 24.53 Angstrom to the mesoporous form.

Comparative Example 2: The same zeolite was treated as in Comparative Example 1 in the same manner with the exception that a five-fold amount of base (30 mmol per gram of zeolite) was used. The resulting solid showed that neither mesopore surface or mesopore volume increased (Table 3). Hence, even at much increased alkalinity, the standard state-of-the-art base treatment does not enable to convert a faujasite with Si/Al<5 and unit cell size of 24.53 Angstrom to the mesoporous form.

Comparative Example 3: A faujasite with Si/Al 2.6, unit cell size of 24.65 Angstrom, and in the sodium form (CBV 100 supplied by Zeolyst) was exposed to a sequential acid and base treatment as is known in the state of the art. To this end, an aqueous solution of 1.6 mmol g$^{-1}$ of citric acid was made, which was contacted with 67 g L$^{-1}$ of zeolite. The acid treatment was performed at 95° C. for 6 h in a stirred round-bottomed flask on a 100 ml scale. After the reaction, the solid was isolated from the suspension using Buchner filtration and dried. The resulting solid was subsequently exposed to a base treatment in the same fashion as Comparative Example 1. The resulting solids from Comparative Examples 3-5 show largely preserved micropore volumes, significantly increased BET surface areas, strongly enhanced mesopore surfaces, and strongly enhanced mesopore volumes (Table 3), confirming that the established acid-base treatments in the state-of-the-art enable to convert a faujasite with Si/Al<5 and unit cell size of 24.65 Angstrom suitably to the mesoporous form.

Comparative Example 4: The same faujasite and treatment as in Comparative Example 3 were used with the exception that, instead of 1.6 mmol g$^{-1}$ of citric acid, 1.6 mmol g$^{-1}$ of EDTA was used.

Comparative Example 5: The same faujasite and treatment as in Comparative Example 3 were used with the exception that, instead of 1.6 mmol g$^{-1}$ of citric acid, 3.2 mmol g$^{-1}$ of malic acid was used.

Comparative Example 6: A faujasite with Si/Al 2.6, unit cell size of 24.53 Angstrom, and in the ammonium form (CBV 500 supplied by Zeolyst) was exposed to the same treatment as in Example 3. The resulting solids from Comparative Examples 6 to 9 show only in some cases attractive high mesopore volumes and surface areas (Table 3). Moreover, the BET surface areas and the micropore volumes are systematically significantly lower compared to the non-treated parent zeolite. Hence, this proves that the methods in the state of the art, although effective for a faujasite with Si/Al=2.6 and unit cell size of 24.65 Angstrom, are not or substantially less effective to prepare mesoporous zeolites from a faujasite with Si/Al<5 and unit cell size in the range of 24.53 Angstrom. Within Comparative Examples 6 to 9, the amount of protonic cations derived from the salts (citric acid, $H_4EDTA$, and tartaric acid) is in each case 100%.

Comparative Example 7: The faujasite and treatment as in Comparative Example 6 were used with the exception that, instead of 1.6 mmol $g^{-1}$ of citric acid, 2.2 mmol $g^{-1}$ of $H_4EDTA$ was used.

Comparative Example 8: The same faujasite and treatment as in Comparative Example 6 were used with the exception that, instead of 1.6 mmol $g^{-1}$ of citric acid, 1.5 mmol $g^{-1}$ of $H_4EDTA$ was used.

Comparative Example 9: The same faujasite and treatment as in Comparative Example 6 were used with the exception that, instead of 1.6 mmol $g^{-1}$ of citric acid, 3.2 mmol $g^{-1}$ of tartaric acid was used.

Figure 2:
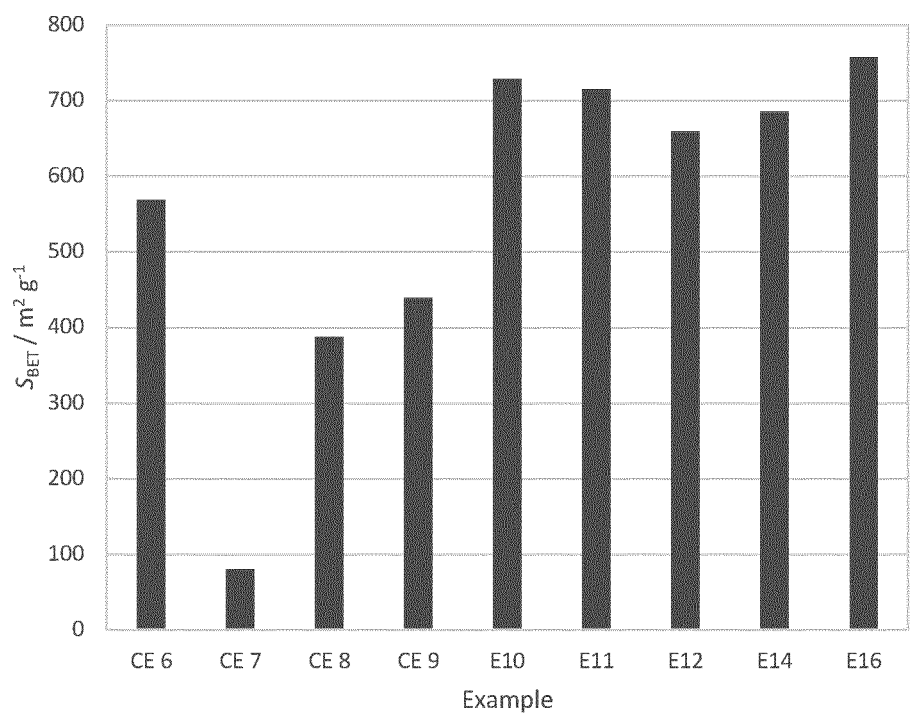
FIG. 2: BET surface area ($S_{BET}$) for the solids derived from the various examples. The samples according to the invention display the preferred high surface areas.

Example 10: The same faujasite zeolite and treatment as in Comparative Example 6 were used with the exception that, instead of 1.6 mmol $g^{-1}$ of citric acid, 2.2 mmol $g^{-1}$ of $NaH_2$citrate was used. In this case the amount of protons derived from the salt in the acid step was 50%. The resulting solid demonstrates, like the solids obtained Examples 11, 12, 14, and 16, that the inventive treatment applied to faujasites with Si/Al=2.6 and unit cell size of 24.53 Angstrom yields mesoporous zeolites with significantly increased BET surfaces, largely maintained micropore volumes, and largely enhanced mesopore surfaces and volumes (Table 3). Hence, only acid and base treatments according to the invention enable to yield, starting from a faujasite with Si/Al<5 and unit cell size of 24.53 Angstrom, solids with preferred porosity: high $V_{micro}$ with high $V_{meso}$ (FIG. 1), and high SBET (FIG. 2). In each case of the examples, the amount of protons derived from the salt in the acid step within the pK range of −3 to 6.0 was in the range of 20-90%.

Example 11: The same faujasite and treatment as in Comparative Example 6 were used with the exception that, instead of 1.6 mmol $g^{-1}$ of citric acid, 1.1 mmol $g^{-1}$ of $H_4EDTA$ and 1.1 mmol $g^{-1}$ of $Na_2H_2EDTA$ was used. In this case the amount of protons derived from the salt in the acid step was 50%.

Example 12: The same faujasite and treatment as in Comparative Example 6 were used with the exception that, instead of 1.6 mmol $g^{-1}$ of citric acid, 3.2 mmol $g^{-1}$ of tartaric acid and 3.2 mmol $g^{-1}$ of NaOH was used. In this case the amount of protons derived from the salt in the acid step was 50%.

Comparative Example 13: The same faujasite and treatment as in Comparative Example 6 were used with the exception that, instead of 1.6 mmol $g^{-1}$ of citric acid, 2.2 mmol $g^{-1}$ of $Na_2H$citrate was used. Although the treatment yielded a preserved microporosity and SBET, the treatment did not increase the mesopore surface or volume substantially (Table 3). In this case the amount of protons derived from the salt in the pK range of −3 to 6.0 was 0%.

Example 14: The same faujasite and treatment as in Comparative Example 6 were used with the exception that, instead of 1.6 mmol $g^{-1}$ of citric acid, 1.5 mmol $g^{-1}$ of $H_4EDTA$ and 1.5 mmol $g^{-1}$ of NaOH was used. In this case the amount of protons derived from the salt in the acid step was 50%.

Comparative Example 15: The same faujasite and treatment as in Comparative Example 6 were used with the exception that, instead of 1.6 mmol $g^{-1}$ of citric acid, 3.0 mmol $g^{-1}$ of $Na_2H_2EDTA$ was used. Although the treatment yielded a preserved microporosity and SBET, the treatment did not increase the mesopore surface or volume substantially (Table 3). In this case the amount of protons derived from the salt in the pK range of −3 to 6.0 was 0%.

Example 16: The same faujasite and treatment as in Comparative Example 6 were used with the exception that, instead of 1.6 mmol $g^{-1}$ of citric acid, 1.1 mmol $g^{-1}$ of $H_4EDTA$ and 1.1 mmol $g^{-1}$ of $Na_2H_2EDTA$ was used, and that, instead of a direct addition of the zeolite to the acid or basic solution, the acid and base were gradually added during the acid or base treatment, respectively. During the acid treatment this was achieved by adding 12 times 0.09 mmol $g^{-1}$ of $H_4EDTA$ and $Na_2H_2EDTA$ powder every 30 min. During the base treatment this was achieved by suspending the zeolite in 90 mL of water to which the base was added gradually during 30 min at a rate of 0.2 mmol of NaOH per gram of starting zeolite per min using a 2 M NaOH stock solution. In this case the amount of protons derived from the salt in the acid step was 50%. Of the different inventive examples, this example displayed the highest SBET demonstrating that the gradual addition has definite benefits over a direct addition (FIG. 2).

Comparative Example 17: The same faujasite and treatment as in Comparative Example 6 were used with the exception that, instead of 1.6 mmol $g^{-1}$ of citric acid, 3.0 mmol $g^{-1}$ of $H_3PO_4$ was used, instead of a direct addition of the zeolite to the basic solution, the base was gradually added during base treatment, and instead of 6 mmol of base per gram of zeolite, 3 mmol $g^{-1}$ was used. The gradual base treatment was executed by suspending the zeolite in 90 mL of water to which the base was added gradually during 30 min at a rate of 0.1 mmol of NaOH per gram of starting zeolite per min using a 1 M NaOH stock solution. In this case the amount of protons derived from the salt in the acid step was 100%. The resulting sample displayed an enhanced external surface (Table 4), but the $S_{BET}$, $V_{micro}$, and $V_{meso}$ were inferior compared to the parent zeolite. The micropore volume was even strongly reduced to less than 50% that of the parent.

Example 18: The same faujasite and treatment as in Comparative Example 17 were used with the exception that, an additional 1.1 mmol $g^{-1}$ of $Na_3PO_4$ was used in the acid treatment, that not 3 mmol $g^{-1}$ but 6 mmol $g^{-1}$ of NaOH was used in the base treatment, and that the stock solution was not 1 M but 2 M NaOH. The combination of the 1.1 mmol $g^{-1}$ $Na_3PO_4$ and the 3.0 mmol $g^{-1}$ of $H_3PO_4$ yields an averaged phosphate salt with 27% sodium and 73% protons as cations applied in the acid treatment. Of the 73% of protons, 66% is not counted as they are not within the suitable pKa range (Table 2), yielding therefore a ratio of non-acidic cations versus acid cations of 27 to 7. Hence, 21% of the relevant cations are protonic and 79% are not protonic, being within the scope of the invention. The resulting sample displayed an enhanced external surface, similar like in Comparative Example 17 (Table 4). Moreover, even though the same amount of protons were exposed to the solid as in Comparative Example 17, the $S_{BET}$, $V_{micro}$, and $V_{meso}$ of the solid produced in Example 18 were largely superior. The invention enabled to largely preserve the micropore structure, as judged by the high $V_{micro}$, and enabled, unlike the state of the art method, to yield a mesopore volume and mesopore surface superior compared to that of the parent zeolite.

TABLE 1

Porous properties faujasite zeolites before ('parent') and after ('treated') various state-of-the-art post-synthetic treatments to introduce mesoporosity. For USY1-P the reported treatments do not enable to combine a largely preserved micropore volume with a strongly increased mesopore volume.

| Zeolite | Treatment | Unit cell size (Angstrom) | Bulk Si/Al ratio (mol/mol) | Micropore volume (ml/g) | Mesopore volume (ml/g) |
|---|---|---|---|---|---|
| Y-P | None (parent) | 24.68 | 2.6 | 0.30 | 0.04 |
| Y-treated | Acid-base | | | 0.29 | 0.50 |
| USY1-P | None (parent) | 24.53 | 2.6 | 0.30 | 0.11 |
| USY1-treated | Base | | | 0.26 | 0.10 |
| USY1-treated | Acid-base | | | 0.13 | 0.47 |
| USY2-P | None (parent) | 24.35 | 6.0 | 0.25 | 0.15 |
| USY2-treated | Base | | | 0.24 | 0.37 |

TABLE 2

List of common inorganic and organic acids and their pKa values in water.

| Acid | pKa, 1 | pKa, 2 | pKa, 3 | pKa, 4 |
|---|---|---|---|---|
| HCl | −6.0 | — | — | — |
| formic acid | 3.8 | — | — | — |
| Nitric | −1.4 | — | — | — |
| boric acid | 9.2 | 12.4 | 13.3 | — |
| oxalic acid | 1.3 | 4.3 | — | — |
| phosphoric acid | 2.2 | 7.2 | 12.3 | — |
| Sulfuric | −3.0 | 2.0 | — | — |
| Acetic acid | 4.8 | — | — | — |
| Malonic acid | 2.8 | 5.7 | — | — |
| Tartronic acid | 2.4 | 4.5 | — | — |
| Acrylic acid | 4.3 | — | — | — |
| Fumaric Acid | 3.0 | 4.4 | — | — |
| Maleic Acid | 1.9 | 6.1 | — | — |
| Propanoic acid | 4.9 | — | — | — |
| Succinic Acid | 4.2 | 5.6 | — | — |
| Malic acid | 3.4 | 5.2 | — | — |
| Tartaric acid | 2.9 | 4.4 | — | — |
| Butyric acid | 4.8 | — | — | — |
| Benzoic acid | 4.2 | — | — | — |
| Glutaric acid | 4.3 | 5.4 | — | — |
| citric acid | 3.1 | 4.8 | 6.4 | — |
| H4EDTA | 2.0 | 2.7 | 6.2 | 10.3 |

TABLE 3

Summary of the porous properties of the parent faujasites and the solids obtained by Examples (E) and Comparative Examples (CE) 1 to 16. U.c.s. refers to 'unit cell size'.

| | U.c.s. of parent (Angstrom) | $S_{BET}$ (m² g⁻¹) | $S_{meso}$ (m² g⁻¹) | $V_{micro}$ (cm³ g⁻¹) | $V_{meso}$ (cm³ g⁻¹) | $V_{pore}$ (cm³ g⁻¹) |
|---|---|---|---|---|---|---|
| Parent | 24.53 | 604 | 87 | 0.26 | 0.1 | 0.36 |
| CE1 | 24.53 | 558 | 66 | 0.25 | 0.1 | 0.35 |
| CE2 | 24.53 | 630 | 59 | 0.29 | 0.08 | 0.37 |
| Parent | 24.65 | 688 | 23 | 0.33 | 0.02 | 0.35 |
| CE3 | 24.65 | 722 | 198 | 0.27 | 0.39 | 0.66 |
| CE4 | 24.65 | 799 | 180 | 0.32 | 0.35 | 0.67 |
| CE5 | 24.65 | 692 | 324 | 0.19 | 0.49 | 0.68 |
| CE 6 | 24.53 | 568 | 300 | 0.14 | 0.32 | 0.46 |
| CE 7 | 24.53 | 80 | 29 | 0.03 | 0.05 | 0.08 |
| CE 8 | 24.53 | 387 | 58 | 0.17 | 0.09 | 0.26 |
| CE 9 | 24.53 | 439 | 197 | 0.12 | 0.25 | 0.37 |
| E10 | 24.53 | 728 | 216 | 0.26 | 0.32 | 0.58 |
| E11 | 24.53 | 715 | 334 | 0.19 | 0.52 | 0.71 |
| E12 | 24.53 | 659 | 316 | 0.18 | 0.37 | 0.55 |
| CE13 | 24.53 | 630 | 94 | 0.27 | 0.1 | 0.37 |
| E14 | 24.53 | 685 | 142 | 0.28 | 0.19 | 0.47 |
| CE15 | 24.53 | 695 | 73 | 0.32 | 0.13 | 0.45 |
| E16 | 24.53 | 757 | 258 | 0.25 | 0.36 | 0.61 |

TABLE 4

Summary of the porous properties of the parent faujasites and the solids obtained by Example 18 and Comparative Example 17. U.c.s. refers to 'unit cell size'.

| | Parent | CE17 | E18 |
|---|---|---|---|
| U.c.s. of parent/Angstrom | 24.53 | 24.53 | 24.53 |
| $S_{BET}$/m²g⁻¹ | 604 | 348 | 597 |
| $S_{meso}$/m²g⁻¹ | 87 | 117 | 110 |
| $V_{micro}$/cm³g⁻¹ | 0.26 | 0.12 | 0.25 |
| $V_{meso}$/cm³g⁻¹ | 0.10 | 0.09 | 0.12 |
| $V_{pore}$/cm³g⁻¹ | 0.36 | 0.21 | 0.37 |

The invention claimed is:

1. A process for treating a faujasite zeolite, the process comprising:
    treating a faujasite zeolite in a protonic or ammonium form with an acid, the faujasite zeolite having a unit cell size less than 24.58 Angstrom and a bulk Si/Al ratio less than 5 mol mol⁻¹; and
    after treating the faujasite zeolite with the acid, treating the faujasite zeolite with a base to obtain a treated faujasite zeolite having a micropore volume greater than 0.18 mL g⁻¹, a mesopore volume greater than 0.19 mL g⁻¹, and an overall BET surface area greater than 600 m² g⁻¹,
    wherein:
    treating the faujasite zeolite with the acid comprises contacting the faujasite zeolite with a first aqueous solution, the first aqueous solution comprising at least one carboxylate-containing salt that is suitable to dissociate at least partially in the first aqueous solution into cations and anions, wherein:
    the concentration of the at least one carboxylate-containing salt in the first aqueous solution is from 0.25 mmol salt per gram of the faujasite zeolite to 10 mmol salt per gram of the faujasite zeolite;
    the anions are suitable to form multi-ligand complexes with aluminum; and
    20 mol % to 90 mol % of the cations having a pK from −3 to 6 are protonic;
    treating the faujasites zeolite with the acid is performed at:
        a temperature from 25° C. to 100° C. over 0.5 hours to 24 hours; and
        a solid-to-liquid ratio, expressed in grams of the faujasite zeolite per liter of the first aqueous solution, of 10 g/L to 200 g/L; and
    the faujasite zeolite is contacted with the first aqueous solution by gradual addition, whereby the first aqueous solution is added to the faujasites zeolite at a rate of at most 0.25 mmol salt from the at least one carboxylate-containing salt in the first aqueous solution per gram of the faujasite zeolite per hour; and treating the faujasite zeolite with the base comprises contacting the faujasite zeolite with a basic aqueous solution having a pH greater than 7.

2. The process of claim 1, wherein at least 20% of the aluminum of the faujasite zeolite to be treated is extra-framework aluminum.

3. The process of claim 1, wherein the carboxylate-containing salts are salts of EDTA, salts of citric acid, salts of malic acid, or salts of tartaric acid.

4. The process of claim 1, wherein the basic aqueous solution comprises NaOH, KOH, CsOH, $NH_4OH$, or a combination thereof.

5. The process of claim 1, wherein:
the basic aqueous solution comprises at least one base;
treating the faujasite zeolite with the base is performed at a temperature from 25° C. to 100° C., over a time period from 1 minute to 6 hours, and with a solid-to-liquid ratio of 5 g/L to 150 g/L;
the at least one base has a concentration from 0.5 mmol base per gram of the faujasite zeolite to 12 mmol base per gram of the faujasite zeolite; and the basic aqueous solution is gradually added to the faujasite zeolite at a rate of at most 3 mmol base per gram of faujasite zeolite per minute.

6. The process of claim 1, further comprising, after treating the faujasite zeolite with the base, performing one or more post-formation treatments to incorporate the faujasite zeolite in a technical catalyst.

7. The process of claim 6, wherein the one or more post-formation treatments comprise one or more of ion exchange, calcination, steaming, shaping, spray drying, or metal deposition.

8. The process of claim 1, wherein the cations comprise non-acidic cations.

9. The process of claim 8, wherein the non-acidic cations are ammonium cations.

10. The process of claim 1, wherein the first aqueous solution comprises more than one salt.

11. The process of claim 1, wherein the first aqueous solution has a pH from 2 to 6.

* * * * *

UNITED STATES PATENT AND TRADEMARK OFFICE
CERTIFICATE OF CORRECTION

| | | |
|---|---|---|
| PATENT NO. | : 12,358,801 B2 | Page 1 of 1 |
| APPLICATION NO. | : 17/416052 | |
| DATED | : July 15, 2025 | |
| INVENTOR(S) | : Danny Verboekend and Martin D'Halluin | |

It is certified that error appears in the above-identified patent and that said Letters Patent is hereby corrected as shown below:

On the Title Page

Column 1, item (71), Applicant, delete "Bertem" and insert --Leuven--, therefor.

Column 1, item (72), Inventors, Line 1, delete "Bertem" and insert --Leuven--, therefor.

Column 1, item (72), Inventors, Line 2, delete "Bertem" and insert --Leuven--, therefor.

Signed and Sealed this
Thirtieth Day of September, 2025

John A. Squires
*Director of the United States Patent and Trademark Office*